United States Patent
Cook et al.

(10) Patent No.: US 11,303,968 B1
(45) Date of Patent: Apr. 12, 2022

(54) PERSONALIZED RANKING OF ENTITIES IN AN ELECTRONIC PROGRAMMING GUIDE FOR LIVE TELEVISION

(71) Applicant: HULU, LLC, Santa Monica, CA (US)

(72) Inventors: Joshua Cook, Tarzana, CA (US); Christopher Russell Kehler, Seattle, WA (US); Lacey Anne Donohue, Los Angeles, CA (US); Charles Francis Moran, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/067,511

(22) Filed: Oct. 9, 2020

(51) Int. Cl.
| | |
|---|---|
| *H04N 21/482* | (2011.01) |
| *H04N 21/2187* | (2011.01) |
| *H04N 21/442* | (2011.01) |
| *H04N 21/258* | (2011.01) |
| *H04N 21/84* | (2011.01) |

(52) U.S. Cl.
CPC ..... *H04N 21/4826* (2013.01); *H04N 21/2187* (2013.01); *H04N 21/25891* (2013.01); *H04N 21/44222* (2013.01); *H04N 21/482* (2013.01); *H04N 21/4821* (2013.01); *H04N 21/4823* (2013.01); *H04N 21/84* (2013.01)

(58) Field of Classification Search
CPC ........... H04N 21/4826; H04N 21/2187; H04N 21/472; H04N 21/482; H04N 21/4821; H04N 21/4823; H04N 21/84; H04N 21/25891; H04N 21/44222
See application file for complete search history.

(56) References Cited

U.S. PATENT DOCUMENTS

| | | | |
|---|---|---|---|
| 10,003,849 B1 | 6/2018 | Killick | |
| 2006/0010464 A1* | 1/2006 | Azami | H04H 60/65 725/9 |
| 2008/0104058 A1* | 5/2008 | Billmaier | H04N 21/4314 |
| 2008/0271078 A1* | 10/2008 | Gossweiler | H04N 21/472 725/40 |
| 2010/0131983 A1* | 5/2010 | Shannon | H04N 21/4314 725/46 |
| 2012/0254910 A1* | 10/2012 | Donoghue | H04N 21/26258 725/14 |
| 2012/0284751 A1 | 11/2012 | Kim et al. | |

(Continued)

FOREIGN PATENT DOCUMENTS

| | | |
|---|---|---|
| KR | 1020150072982 A | 6/2015 |
| KR | 1020160021197 A | 2/2016 |

OTHER PUBLICATIONS

International Application Serial No. PCT/US2021/053526, Search Report and Written Opinion dated Jan. 20, 2022, 10 pgs.

*Primary Examiner* — John R Schnurr
(74) *Attorney, Agent, or Firm* — Kwan & Olynick LLP

(57) ABSTRACT

In some embodiments, a method receives a list of ranked entities for video playback for a first interface in a first layout. The list of ranked entities being ranked based on personalized information for a user account. The list of ranked entities is used to determine an ordering of entities in slots of an electronic programming guide. The slots of the electronic programming guide display the entities in a second layout based on a time dimension. The method outputs information to display at least a portion of the entities in the electronic programming guide based on the ordering of entities.

22 Claims, 10 Drawing Sheets

(56) References Cited

U.S. PATENT DOCUMENTS

| | | | |
|---|---|---|---|
| 2015/0169557 A1* | 6/2015 | Ciordas | H04N 21/4826 |
| | | | 707/609 |
| 2015/0365729 A1* | 12/2015 | Kaya | H04N 21/4826 |
| | | | 725/14 |
| 2015/0382069 A1* | 12/2015 | Pearlman | H04N 21/4821 |
| | | | 725/46 |
| 2017/0272684 A1 | 9/2017 | Coburn et al. | |
| 2018/0113579 A1* | 4/2018 | Johnston | G06F 3/0482 |
| 2019/0124402 A1* | 4/2019 | Nagai | H04N 21/4823 |
| 2019/0320230 A1* | 10/2019 | Zhang | H04N 21/47202 |
| 2019/0356963 A1* | 11/2019 | Roe | H04N 21/4826 |
| 2020/0082009 A1* | 3/2020 | Traynham | G06F 16/248 |
| 2021/0089545 A1* | 3/2021 | Suslov | H04N 21/4826 |
| 2021/0092492 A1* | 3/2021 | Klappert | H04N 21/44209 |

* cited by examiner

PERSONALIZED RANKING OF ENTITIES IN AN ELECTRONIC PROGRAMMING GUIDE FOR LIVE TELEVISION

BACKGROUND

An electronic programming guide may be a menu-based system that outputs information that describes content in a linear time-based format. For example, the electronic programming guide may display scheduling information for current and upcoming content, such as television programs, radio programs, and other media.

In one format of an electronic programming guide, the layout may include multiple rows with each row being associated with a channel being offered by a video delivery service. Each channel may list content that is being offered at the current time and upcoming times for the channel. For instance, for a channel #1, the current program being offered is listed in a row, and at a time after the current program ends, another program may be listed in the row. Typically, the channels may be organized sequentially, such as based on a channel identifier. For instance, a channel #1 is displayed in a first row of the guide, a channel #2 is displayed in a next row, and so on. The organization of channels in the electronic programming guide may be fixed for all users. However, some users may prefer different channels. For example, one user may prefer channel #1 and does not need to scroll through the electronic programming guide to see what is on channel #1. However, the electronic programming guide may not display all channels on the interface at the same time. Accordingly, another user that may prefer channel #20 and may need to scroll to channel #20 to see what is on channel #20 whenever the electronic programming guide is opened.

BRIEF DESCRIPTION OF THE DRAWINGS

With respect to the discussion to follow and to the drawings, it is stressed that the particulars shown represent examples for purposes of illustrative discussion and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
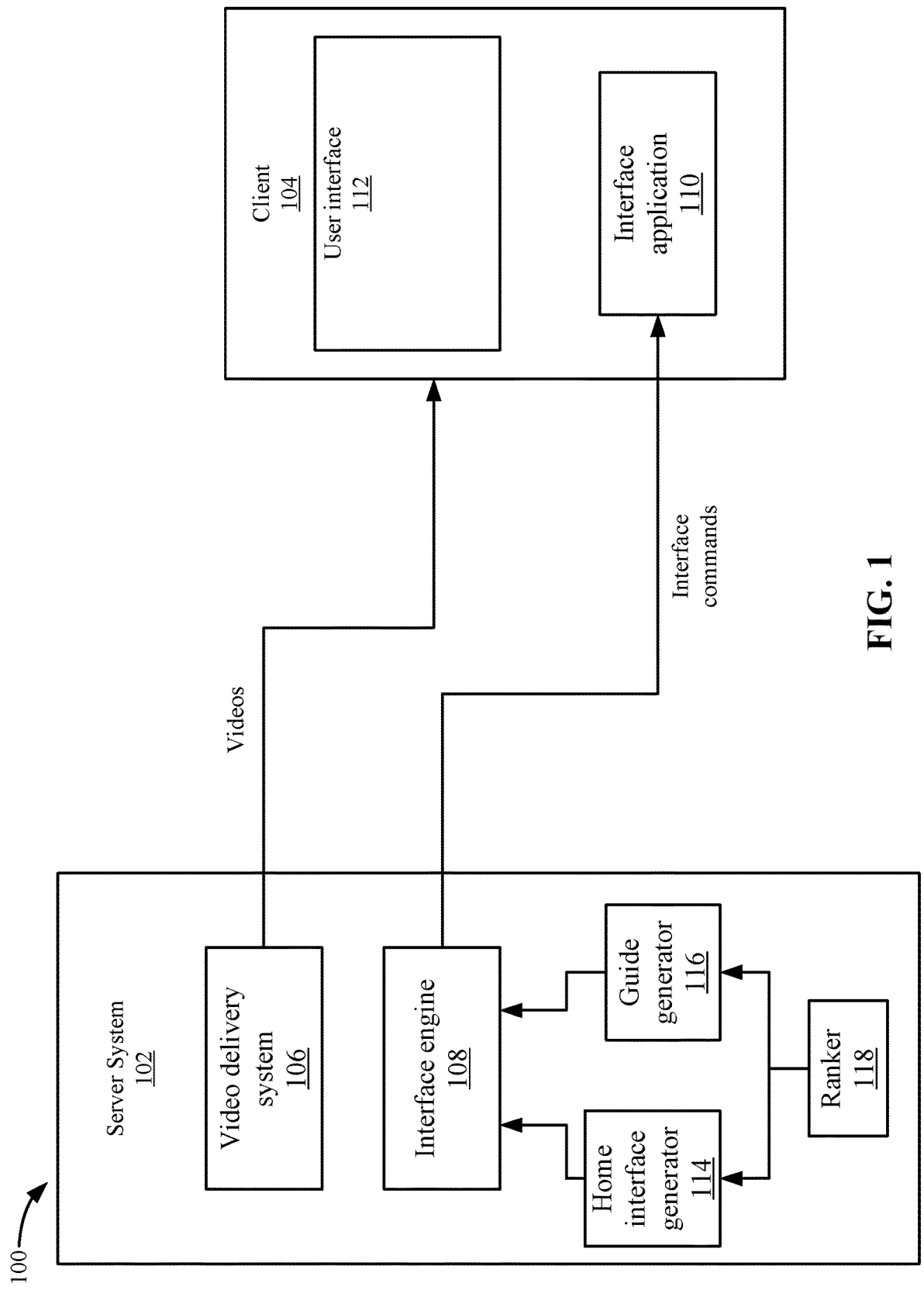
FIG. 1 depicts a simplified system for generating an electronic programming guide according to some embodiments.

Described herein are techniques for an electronic programming guide system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A video delivery system may display an interface in different layouts. For example, a first interface layout may list entities, such as programs, movies, campaigns, etc., that are offered by the video delivery system. The entities may be selected for playback at the current time. Also, the entities may be grouped into groupings that may be referred to as collections. One collection may list entities that are currently live, which may mean the entities are being offered at the current time on a linear schedule of programming, such as on live television programming. This collection may be referred to as the live-now collection but may be referred to by other names. Some entities in the live-now collection may only be viewable while the program is being offered live. That is, when a live program ends, that instance of the program may not be viewed as a live program at the current time on that channel. Other collections may include video-on-demand programs that may be available for viewing at any time, such as collections for movies, sports, saved programs, etc.

An entity ranker may rank the entities for the live-now collection for a user. For example, the entity ranker may use personalized information for a user to rank the entities. In this way, different users may receive different recommendations for entities in the live-now collection. This may increase the relevancy of entities included in the live-now collection to users, which may increase the selection of one of the entities in the live-now collection for viewing. The entity ranker may rank entities based on which entities are currently live in the linear schedule of programming. The entities that are ranked may also include other entities, such as entities that promote content that may not be live at the current time but may be live in an upcoming time period.

Another way to display the interface may be using an electronic programming guide (EPG) layout. The electronic programming guide layout may include different formats that may be based on displaying entities using time-based methods. For example, the electronic programming guide may display rows that include channels and each channel displays associated entities being offered by the respective channels from a current time to a range of future times. As discussed in the Background, when the electronic programming guide orders channels sequentially, the electronic programming guide may not benefit from personalization of the channel order. In some cases, the first interface may be a home interface that is first presented to a user account when the user interface is first displayed upon an initial login by the user. Also, the home interface may be the interface that is used more often by a user account. When different methods for ordering entities are used between the live-now collection and the electronic programming guide, a seamless experience is not provided when user accounts switch between the interfaces. Accordingly, the video delivery system may use the list of ranked entities for the live-now collection to format the electronic programming guide.

In some embodiments, the video delivery system may use the list of ranked entities to rearrange a layout of the electronic programming guide. As discussed above, the list of ranked entities may rank entities that are live at the current time. Then, the video delivery system may determine the layout of the electronic programming guide by converting the time-based layout based on the list of ranked entities to a layout for the electronic programming guide. For example, if a channel layout is being used, the video delivery system determines the channels associated with the ranked entities. Then, the video delivery system may re-arrange the channel sequence in the electronic programming guide to be similar to the order of the channels associated with the ranked entities. For example, if the first-ranked entity in the live-now collection is associated with a channel #3, the video delivery system may move channel #3 to the top priority position in the electronic programming guide. Then, if the second entity in the ranking is associated with channel #10, the video delivery system moves channel #10 to the second priority position in the electronic programming guide. The video delivery system thus rearranges the ordering of the electronic programming guide in the layout based on the ranking of entities for the live-now collection. When a user account switches between the first interface and the electronic programming guide, the electronic programming guide presents a consistent view for the list of ranked entities between the live-now collection and the electronic programming guide interfaces. Other layouts for the electronic programming guide may also be appreciated and will be described below.

System Overview

FIG. 1 depicts a simplified system 100 for generating an electronic programming guide according to some embodiments. System 100 includes a server system 102 and a client 104. Although a single server system 102 and a single client 104 are described, it will be understood that the functionalities described with respect to server system 102 may be distributed across multiple computing devices. Also, server system 102 may be communicating with multiple clients 104.

Server system 102 includes a video delivery system 106 that can deliver videos to client 104, which can be displayed on a user interface 112 via a media player (not shown). In some embodiments, video delivery system 106 may include one or more servers that may be implemented using a content delivery network (CDN).

Client 104 may include a computing device that can play videos, such as mobile devices, smartphones, tablet devices, living room devices, televisions, etc. Client 104 includes an interface application 110 that generates an interface in user interface 112. Interface application 110 may allow a user to play back videos from video delivery system 106 and also browse a library of videos that are offered by a video delivery service. User interface 112 may display entities that may represent any form of content. For example, an entity may be associated with a program, which may be a television program, movie, promoted content, a live sporting event telecast, an episode of a program, an advertisement, or other content. The entities may be an icon, text, or other information that describes the respective video.

As will be discussed in more detail below, interface application 110 may display a first interface in a first layout and a second interface in a second layout. A layout may be an organization of entities based on a characteristic. The first interface may be an interface that displays entities that can be selected for playback at the current time. For example, the interface may be referred to as a home interface, which is an interface that may be first offered to a user upon starting interface application 110 or offered to a user when in the home position of the interface. Although a home interface is described, the first interface does not need to be a home interface. In some examples as described above, the home interface may include the live-now collection in addition to other collections that may include live entities or on-demand entities. The live entities may include entities that are from live television and the on demand entities may be requested on-demand. Live television may be from linear programming that offers entities at set times where users can only watch the programs at the set times. In contrast, entities that are offered on-demand may be requested at any time for viewing.

The second interface may be the electronic programming guide that displays entities based on a time dimension. For example, the electronic programming guide may include entities from a linear programming schedule that may be arranged by channels. In some embodiments, the electronic programming guide does not include on-demand entities. The second interface may arrange the entities based on time ranges that include a current time and other time ranges, such as a current time period (e.g., 9:00 AM to 9:30 AM), future time periods (e.g., 9:30 AM to 10:00 AM), or past time periods (e.g., 8:30 AM to 9:00 AM). The second interface lists entities that are live within the time periods. In some examples, the entities may be arranged in rows that are associated with channels.

An interface engine 108 may send interface commands to interface application 110. Although described as being performed by interface engine 108, the functions described with respect to interface engine 108 may be performed in client 104 by interface application 110 in some cases. The interface commands may provide commands to interface application 110 for generating user interface 112. The interface commands may be sent in response to input received from a user. For example, a user may navigate to different interfaces or perform other actions on the interface. In response to those interactions, interface engine 108 may generate changes to the interface. For example, input may be received from a user to display the electronic programming guide 300. Interface engine 108 receives the input and provides an interface command to interface application 110 to display the electronic programming guide with specific content in a layout. Similarly, interface engine 108 may provide an interface command to interface application 110 to display the first interface with specific content in a layout.

As discussed above, user interface 112 may be displayed in different layouts. A home interface generator 114 generates the home interface. Home interface generator 114 may use a ranker 118 to rank entities based on personalized information for a user account that is using client 104. The user account may be associated with historical behavior, such as a watch history of entities that have been previously watched by the user account. Other personalized information may be entities that the user account has indicated an interest in, such as added to a collection or indicated that the user liked the entity, preferences from the user account, such as sports teams the user likes or channels the user likes, and other personalization features, such as a user's age, a gender of the user, a location of client 104, an hour of the day, a day of the week, last episodes watched, last series watched, last movies watched, etc. Ranker 118 may output a list of ranked entities for the live-now collection. These entities may be associated with content that is live at the current time. For example, if the current time is 9:00 AM, then the ranked list of entities are entities that can be watched live at 9:00 AM. Ranker 118 may rank the entities based on the personalization information for the user account.

Home interface generator 114 receives the list of ranked entities and can generate a layout for the live-now collection. For example, home interface generator 114 orders entities in the live-now collection based on the list of ranked entities. The live-now collection may have slots that are prioritized and home interface generator 114 adds entities from the list of ranked entities to the prioritized slots. For example, a highest ranked entity is added to a first slot (e.g., highest priority) in the live-now collection, the second entity is added to a second highest priority slot, and so on. User interface 112 may also include other collections and home interface generator 114 may generate other lists of entities to display in other collections based on different processes. Interface engine 108 then communicates the entities and layout to interface application 110. For example, interface engine 108 sends identification information for the entities and where in the layout of the home interface the entities should be displayed.

A guide generator 116 may generate the electronic programming guide. As described in the Background, the electronic programming guide may include the channels in a set sequence. To provide a similar personalization to the electronic programming guide as shown in the live-now collection, guide generator 116 may receive the list of ranked entities from ranker 118 and use the list of ranked entities to dynamically alter the layout of the electronic programming guide based on the list of ranked entities. Different methods of changing the layout of the electronic programming guide based on the list of ranked entities will be described in more detail below with respect to FIGS. 3 and 4.

Home Interface

Figure 2:
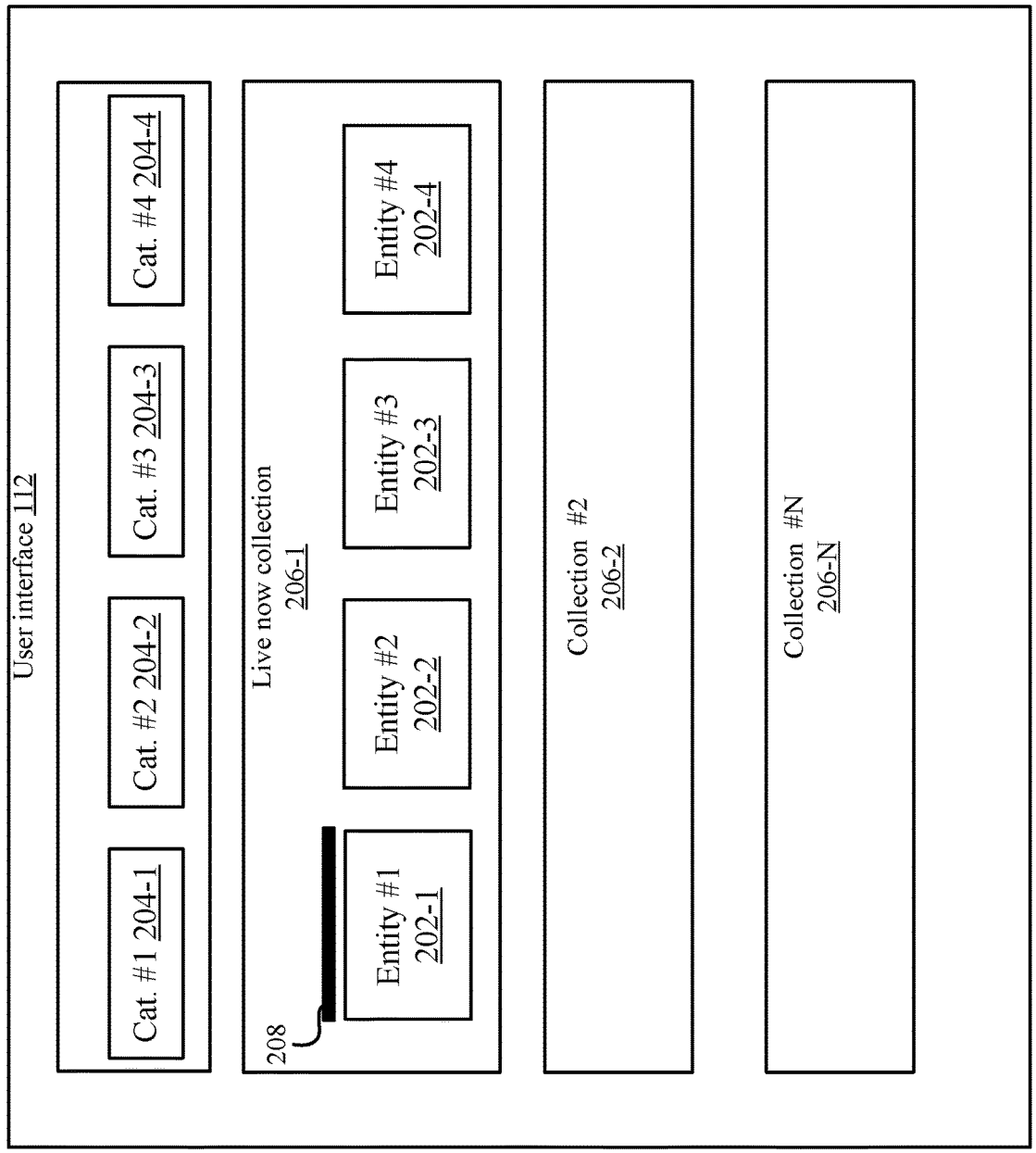
FIG. 2 depicts an example of a layout for a home interface according to some embodiments.

FIG. 2 depicts an example of a home interface according to some embodiments. The home interface may include different categories: category #1 204-1, category #2 204-2, category #3 204-3, and category #4 204-4, but other categories may be appreciated. Categories may group entities based on a characteristic. For example, category #1 204-1 may be the home interface; category #2 204-2 may be videos that have been added by a user; category #3 204-3 may be movies, etc.

In the home interface, different collections 206-1 to 206-N are displayed. Collections 206 may display entities 202 using a selector 208. When selected, user interface 112 may play back the content associated with the respective entity 202. Collections 202 may include more entities 202 that can be displayed on screen. Thus, a user may have to scroll to view entities 202 that are offscreen. In some embodiments, user interface 112 displays entities 202 according to a priority; for instance, the slots in each collection 206 may have associated priorities and entities 202 are inserted into the corresponding slots. The priorities are used to display entities that are determined to be more relevant to a user in higher priority slots that are more likely to be viewed by the user. In some embodiments, a first slot is the highest priority, and may be positioned in a collection differently based on the layout. For example, the first slot may be the leftmost slot on user interface 112 when collections 206 are displayed horizontally, or the topmost slot when collections 206 are displayed vertically.

One collection may be live-now collection 206-1. As discussed above, live-now collection 206-1 may include entities 202 that are currently offered live at the current time. For example, live-now collection 206-1 includes an entity #1 202-1 to entity #4 202-4. Live-now collection 206-1 may display entities 202 according to the list of ranked entities that is received from ranker 118. For example, ranker 118 has ranked entity #1 202-1 as the top-ranked entity for the user account, entity #2 202-2 is ranked as the second entity in the list, and so on. For example, a first slot includes the highest ranked entity of entity #1 202-1, a second slot includes the second highest ranked entity #2 202-2, and so on. Accordingly, live-now collection 206-1 displays entities that are currently live in a personalized order for the user account. By prioritizing entities 202 that are determined to be more relevant to the user account, the user account may be more likely to find and select that entity 202 for playback.

Electronic Programming Guide

Figure 3:
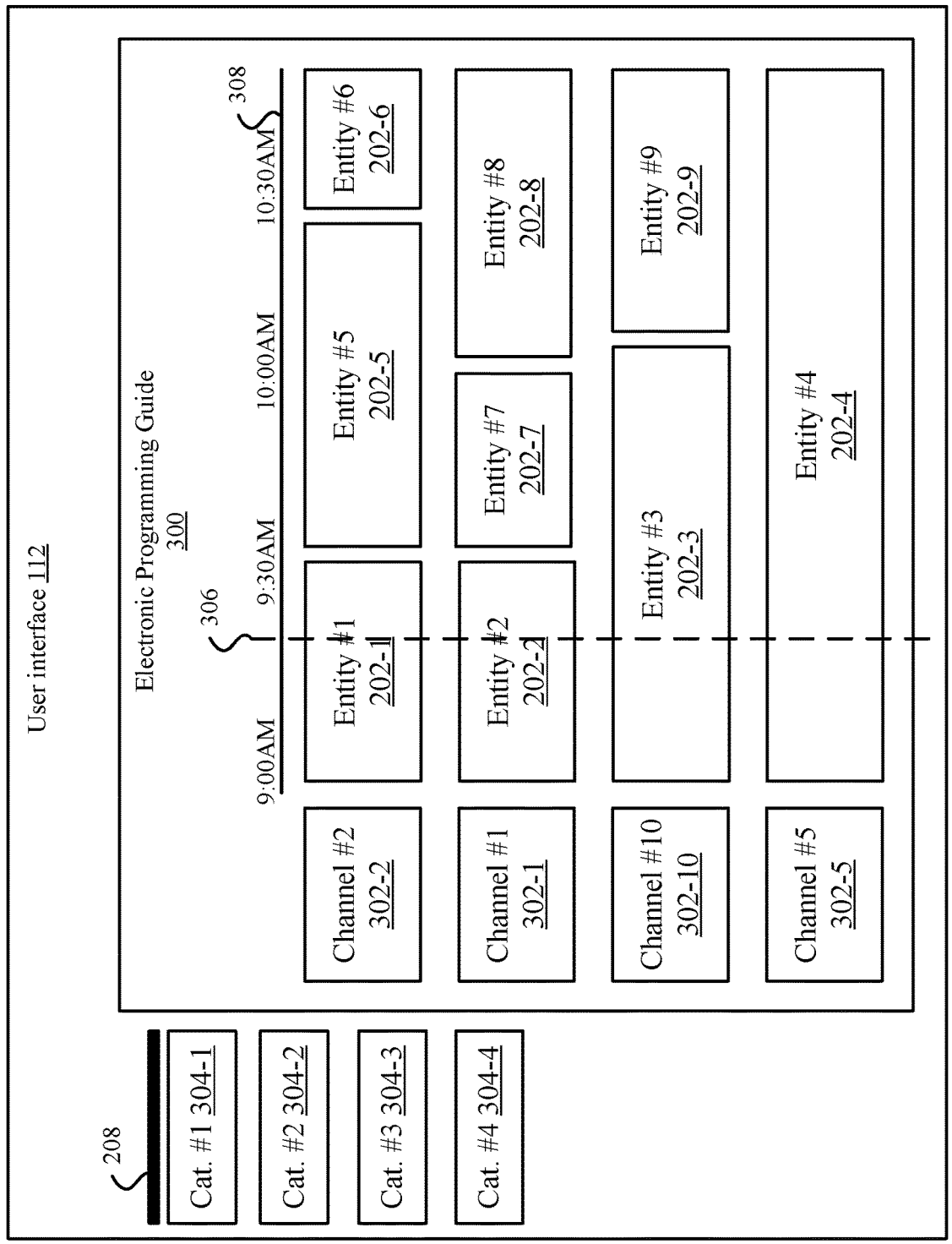
FIG. 3 depicts an example of an electronic programming guide according to some embodiments.
Figure 4:
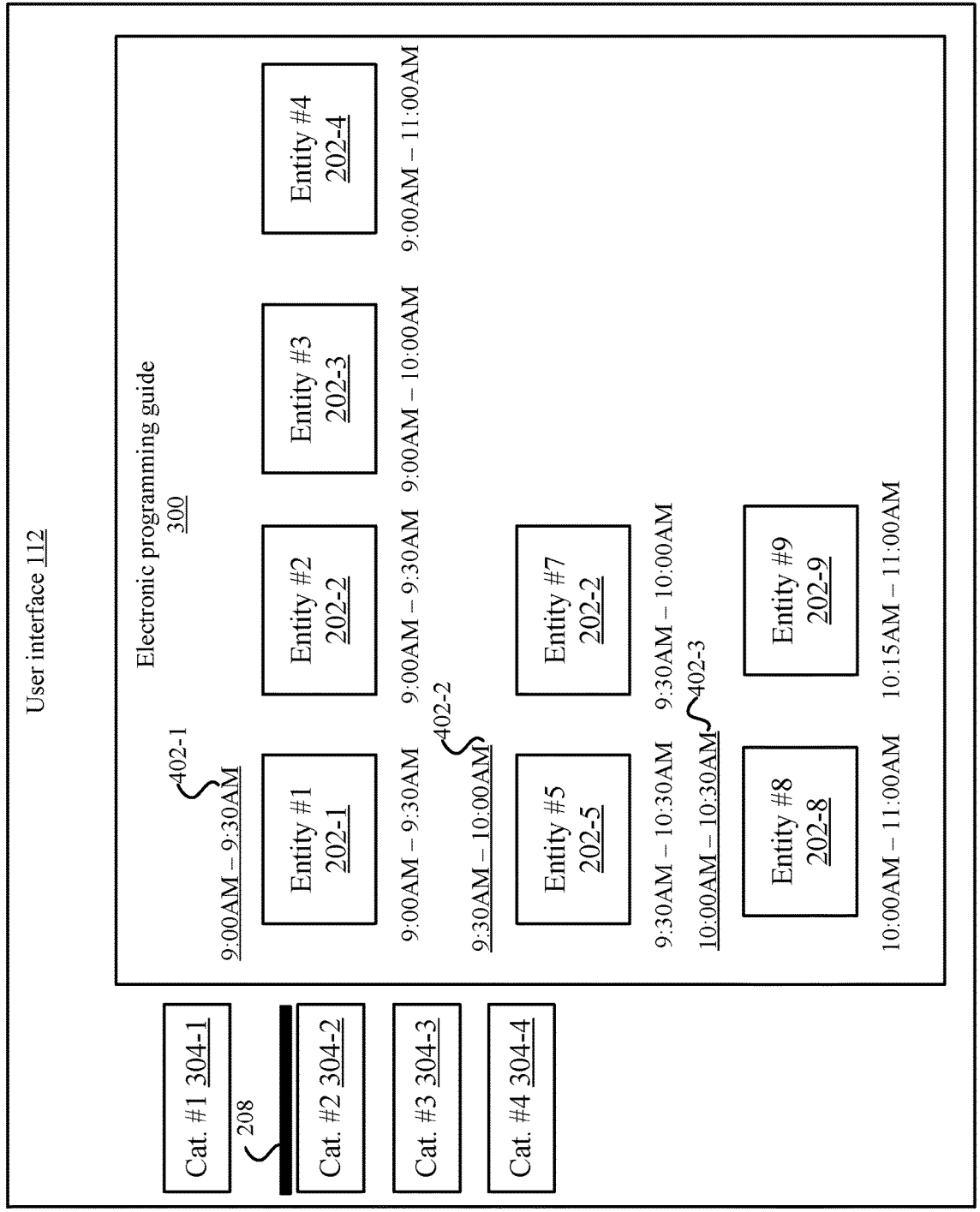
FIG. 4 depicts another example of a layout for the electronic programming guide according to some embodiments.

FIG. 3 depicts a first layout of an electronic programming guide 300 and FIG. 4 depicts a second layout of electronic programming guide 300, but other formats may be appreciated. FIG. 3 depicts an example of a layout for an electronic programming guide 300 according to some embodiments. Electronic programming guide 300 may arrange entities 202 in the guide based on a time dimension. For example, entities may be arranged based on time ranges that go forward in time sequentially from a current time. The time ranges may also cover time from before the current time.

Different categories 304 may be used to display different layouts of electronic programming guide 300. For example, four different layouts may be associated with a category #1 304-1 to a category #4 304-4. Selector 208 may be used to select the different layouts for electronic programming guide 300. For example, the layout for category #1 304-1 is illustrated in FIG. 3 and a layout for category #2 304-2 is illustrated in FIG. 4.

Electronic programming guide 300 may include different slots that are associated with different priorities. For example, the slots may be different rows that display entities 202. A row may be a container or area of user interface 112 that is associated with a grouping of entities 202. In some embodiments, each row may be associated with a channel 302, which may be associated with a grouping of linear live programming. For example, a channel may be associated with a network that offers a specific lineup of live programming for the channel. Channels may be identified by identifiers, which may be numbers, names, etc.

Electronic programming guide 300 also includes a timeline 308 that summarizes the time dimension that is used to organize the layout of electronic programming guide 300. For example, timeline 308 may include different time ranges that may include the time range for the current time and future time ranges. As shown, a current time shown at 306, which is between the time range 9:00 AM to 9:30 AM. Timeline 308 also shows future time ranges from 9:30 AM to 10:00 AM, 10:00 AM to 10:30 AM, etc.

Electronic programming guide 300 arranges the layout of channels in the rows based on a priority for the list of ranked entities. For example, entity #1 202-1 is the first ranked entity in the list of ranked entities. Interface application 110 determines that entity #1 202-1 is associated with channel #2

302-2. Guide generator 116 then lists channel #2 302-2 as the first row with the highest priority to be displayed in electronic programming guide 300. Entity #2 202-2 is the second ranked entity in the list of ranked entities, and guide generator 116 determines the associated channel for entity #2 202-2, which is channel #1 302-1. Guide generator 116 lists channel #1 302-1 to the second highest priority row of electronic programming guide 300. Guide generator 116 similarly determines other channels that are associated with respective entities 202 in the list of ranked entities. For example, channel #10 302-10 is associated with entity #3 202-3 and channel #5 302-5 is associated with entity #4 202-4, respectively, in the list of ranked entities, and the respective channels appear in the next highest priority rows in electronic programming guide 300.

Accordingly, guide generator 116 determines the respective channels with the list of ranked entities and correspondingly alters the layout of electronic programming guide 300 to change the channel layout sequence. Channel #2 302-2 is playing the highest ranked entity of entity #1 202-1 live at the current time and this channel is displayed in the highest priority row of electronic programming guide 300. When electronic programming guide 300 is displayed, a user account views the channel that includes the top ranked entity #1 202-1 in the first row. Also, the user does not have to scroll to find the channel that may be playing the entity the user most likely may want to view. This is advantageous not only to provide focus on the channel in the first row, but also important when higher ranked channels that may be off-screen are moved to be on-screen in the initial display of electronic programming guide 300. For example, channel #10 302-10 may have appeared off-screen if a sequential numbering of channels is used in electronic programming guide 300. However, electronic programming guide 300 displays channel #10 302-10 in the third row when first displayed, which makes it more likely the user account will see a channel that includes an entity 202 that the user account wants to playback.

Using the list of ranked entities to arrange the channel sequence in rows in electronic programming guide 300 also coordinates the visual display of entities with the home interface shown in FIG. 2. For instance, the home interface listed entities #1 202-1 to #4 202-4 in live-now collection 206-1. When the interface switches to electronic programming guide 300, the user still sees entity #1 202-1 to entity #4 202-4 in the same order of rows. The layout may be in a different format, such as the rows in electronic programming guide 300 are vertically stacked in this example; however, the order of entity #1 202-1 to entity #4 202-4 is the same. By keeping the order the same, the user experience for the user account is consistent across the home interface and electronic programming guide 300 with respect to the order of the list of ranked entities.

Electronic programming guide 300 is based on the time dimension and thus other entities may be listed for the channels at future times. For example, instead of just displaying entity #1 202-1 to entity #4 202-4 in electronic programming guide 300, electronic programming guide 300 displays other entities for respective channels. For example, channel #2 302-2 is offering an entity #5 202-5 from 9:30 AM to 10:30 AM, and then an entity #6 202-6 at 10:30 AM. Channel #1 302-1 is offering an entity #7 202-7 from 9:30 AM to 10:00 AM and an entity #8 202-8 at 10:00 AM. Channel #10 302-10 offers an entity #9 202-9 at 10:00 AM and channel #5 302-5 is offering entity #4 202-4 for the entire time range shown in electronic programming guide 300. Entities 202-5 to 202-9 may or may not be ranked as relevant entities to a user account but are listed due to the format of displaying channels. These entities 202 may not have been displayed in the home interface because they are not currently live.

FIG. 4 depicts another example of a layout for electronic programming guide 300 according to some embodiments. In some embodiments, an input to select category #2 304-2 is received, which displays a different layout for electronic programming guide 300. The format of electronic programming guide 300 in FIG. 4 may also be based on a time dimension but may display entities in groupings of time ranges. For example, electronic programming guide 300 may display different ranges of time at 402-1 to 402-3, such as the ranges from 9:00 AM to 9:30 AM, 9:30 AM to 10:00 AM, and 10:00 AM to 10:30 AM. Within the time ranges, electronic programming guide 300 displays entities that are associated with the respective time range, such as entities that may have started during the time range or may be live during the time range. For example, for the time range 9:00 AM to 9:30 AM, which includes the current time, entities #1 to #4 202-1 to 202-4 are shown because these entities 202 start during that time range. Electronic programming guide 300 may arrange entities 202 in prioritized slots according to the list of ranked entities. For example, entity #1 202-1 is listed as the first ranked entity in a first slot in the time range, entity #2 202-2 is listed as the second ranked entity in a second lot in the time range, and so on. This layout also provides a consistent view from the home interface.

Electronic programming guide 300 includes other time ranges after the current time range. Because the list of ranked entities is for entities that are currently live, entities 202 that are listed in future time ranges may not be found in the list of ranked entities. Electronic programming guide 300 may display other entities in the future time ranges. In some embodiments, electronic programming guide 300 displays entities associated with the channels for the respective entities in the list of ranked entities. For example, in the time range 9:30 AM to 10:00 AM, entity #5 202-5 and entity #7 202-7 are shown. Entity #5 202-5 is associated with channel #2 302-2 for entity #1 202-1, and entity #7 202-7 is associated with channel #1 302-1 for entity #2 202-2. For the time range 10:00 AM to 10:30 AM at 402-3, entity #8 202-8 which is associated with channel #2 302-2 and entity #9 202-9, which is associated with channel #10 302-10, are shown. Other entities 202 from channels other than the channels associated with the list of ranked entities may also be shown in the future time ranges and entities 202 from the channels associated with the list of ranked entities do not need to be shown in the future time ranges.

Accordingly, electronic programming guide 300 arranges entities in time ranges based on the list of ranked entities. While channels may not be displayed in rows, electronic programming guide 300 may arrange entities in future time ranges based on the channels associated with the list of ranked entities.

Entity Generation

Figure 5:
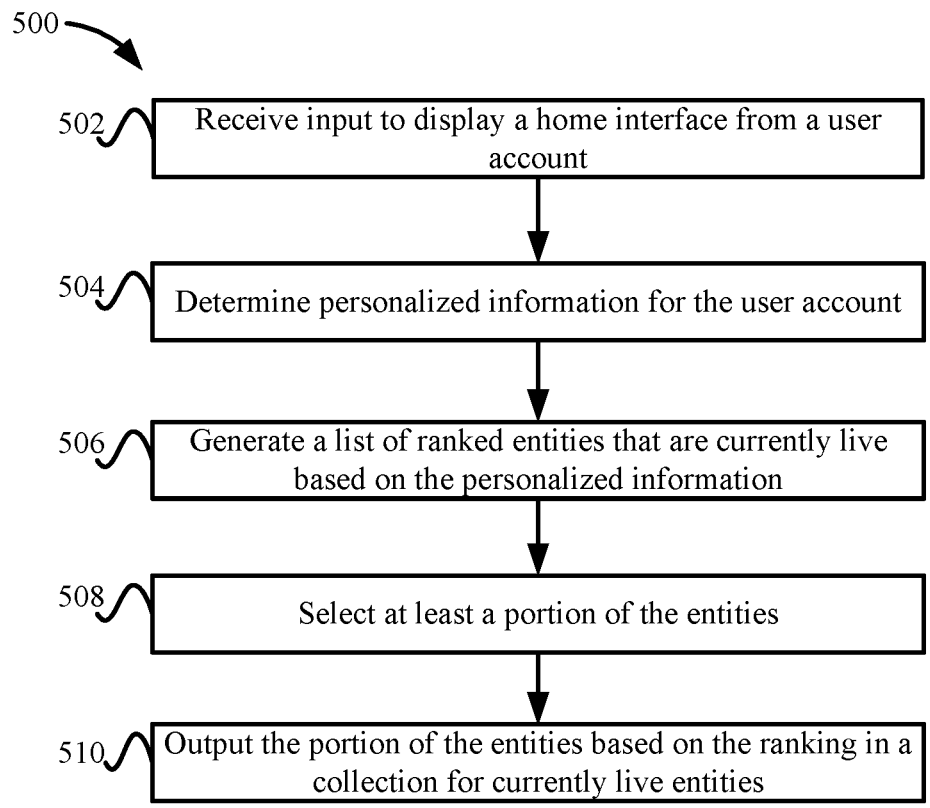
FIG. 5 depicts a simplified flowchart of a method for generating a list of ranked entities according to some embodiments.

FIG. 5 depicts a simplified flowchart 500 of a method for generating a list of ranked entities according to some embodiments. At 502, interface engine 108 receives an input to display the home interface from a user account. Then, at 504, ranker 118 determines personalized information for the user account or the home interface may be displayed automatically. The personalized information may include real-time information regarding the context associated with the user account and/or client 104 in addition to historical information, such as a watch history for the user account.

At 506, ranker 118 generates a list of ranked entities based on the personalized information. For example, ranker 118 may determine entities that are currently live based on a current time. Then, ranker 118 may use a prediction network to rank the entities based on the personalized information. For example, ranker 118 may use a machine-learning model that has been trained based on personalized information for the user account to predict the ranking of entities. Although a machine-learning model is described, other methods may be used to rank the entities, such as a set of rules. Ranker 118 may input features associated with the personalized information into the prediction model and the prediction model may rank the entities that are currently live based on features.

At 508, home interface generator 114 may select at least a portion of the entities. For example, home interface generator 114 may have a limit on the number of entities to display in the home interface. In other examples, home interface generator 114 may select all of the entities in the list of ranked entities. At 510, home interface generator 114 outputs the at least a portion of entities for the live-now collection for currently live entities.

At any time, a user account may display electronic programming guide 300. For example, after displaying the home interface, electronic programming guide 300 may be displayed. However, electronic programming guide 300 may not necessarily be displayed after the home interface.

Figure 6:
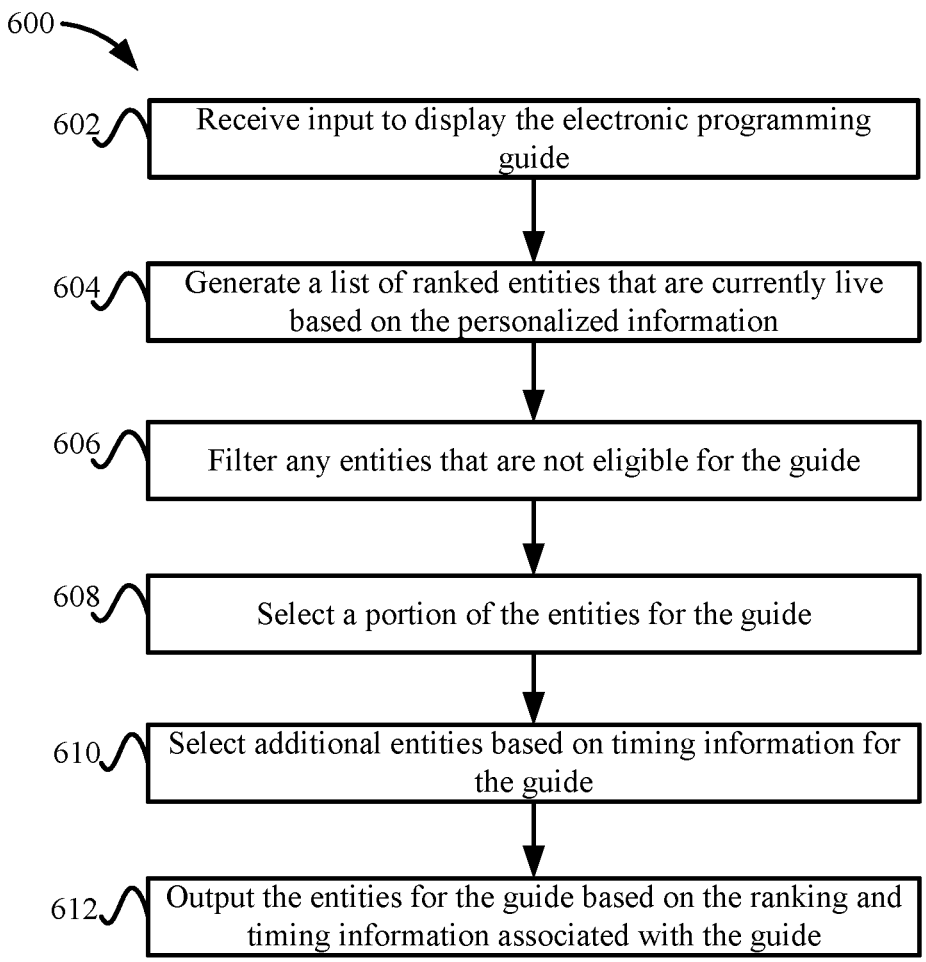
FIG. 6 depicts a simplified flowchart of a method for generating entities for the electronic programming guide according to some embodiments.

FIG. 6 depicts a simplified flowchart 600 of a method for generating entities for electronic programming guide 300 according to some embodiments. At 602, interface engine 108 receives an input to display electronic programming guide 300. At 604, ranker 118 generates a list of ranked entities that are currently live based on personalized information for the user account as described above. This list may have already been generated for the live-now collection or may be newly generated when electronic programming guide 300 is displayed. The list of ranked entities may be a similar list as the one used to generate the home interface. For example, ranker 118 may output entities that are currently live.

At 606, guide generator 116 may filter any entities that are not eligible for electronic programming guide 300. For example, since ranker 118 is generating entities for the home interface, ranker 118 may have ranked entities that are not eligible for electronic programming guide 300. In some examples, ranker 118 may include some content that is not currently live and guide generator 116 may remove those entities. Different rules for filtering entities may be used. For example, some entities that may be removed include advertisements, trailers, promotions of upcoming videos, etc. Also, some entities in the list of ranked entities may not be a playable entity and are also removed. In some examples, some entities may be based on on-channel marketing campaigns that may be marketing content on a channel that may be upcoming. Guide generator 116 may keep the on-channel marketing campaigns for display in electronic programming guide 300 because this programming may be displayed soon in electronic programming guide 300.

At 608, guide generator 116 selects at least a portion of the entities. The selection will be described in more detail with respect to FIG. 7.

At 610, guide generator 116 selects additional entities based on timing information for the guide. For example, guide generator 116 may select entities at a future time from the channels that are associated with the portion of entities. Then, at 612, guide generator 116 outputs the entities based on the ranking and timing information for display in electronic programming guide 300.

Figure 7:
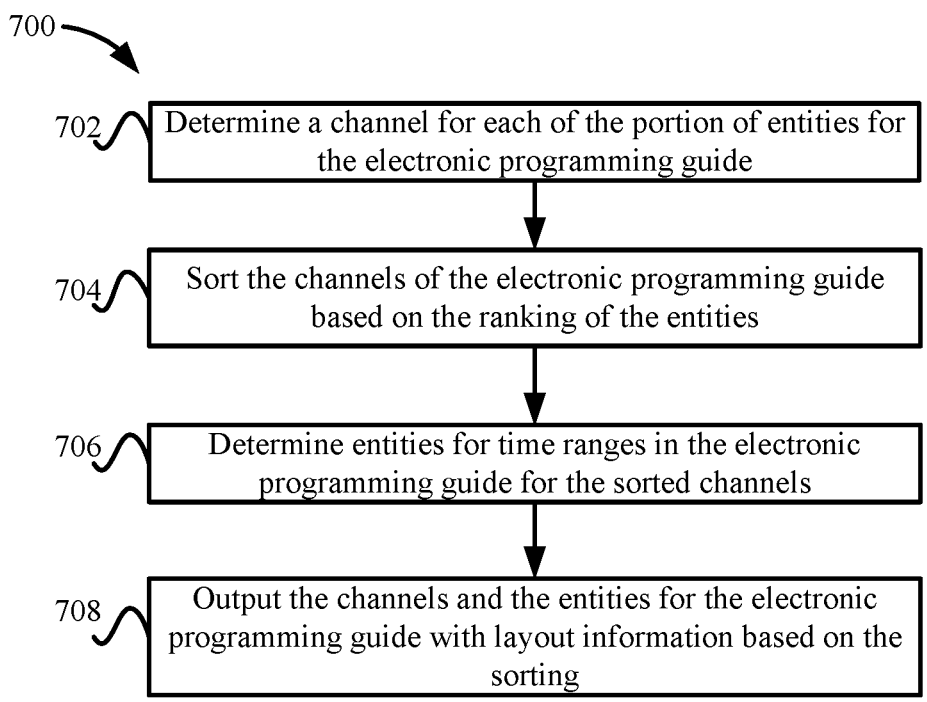
FIG. 7 depicts a simplified flowchart of a method for generating the electronic programming guide according to some embodiments.

As discussed above, electronic programming guide 300 may be displayed in different layouts. In the layout using channels that are displayed in rows, the following process may be used to display entities 202. FIG. 7 depicts a simplified flowchart 700 of a method for generating electronic programming guide 300 according to some embodiments. At 702, guide generator 116 determines a channel for each of the portion of entities 202 for electronic programming guide 300. At 704, guide generator 116 sorts the channels of electronic programming guide 300 based on the ranking of entities 202.

At 706, guide generator 116 may determine entities 202 for time ranges in electronic programming guide 300 for the sorted channels. In some examples, guide generator 116 may query information for the channels to determine the entities 202. Entities 202 may include currently live entities and entities in the future.

At 708, guide generator 116 outputs the channels and entities 202 for electronic programming guide 300 with layout information based on the sorting. For example, the layout information may indicate a row for each respective channel.

When displaying entities 202 in the layout depicted in FIG. 4, guide generator 116 may determine the time ranges for electronic programming guide 300. Guide generator 116 inserts the list of ranked entities in the time range for the current time. Then, guide generator 116 determines entities 202 for the future time ranges, such as by determining entities 202 from the channels associated with the list of ranked entities for the future time ranges.

Guide Refresh

Figure 8:
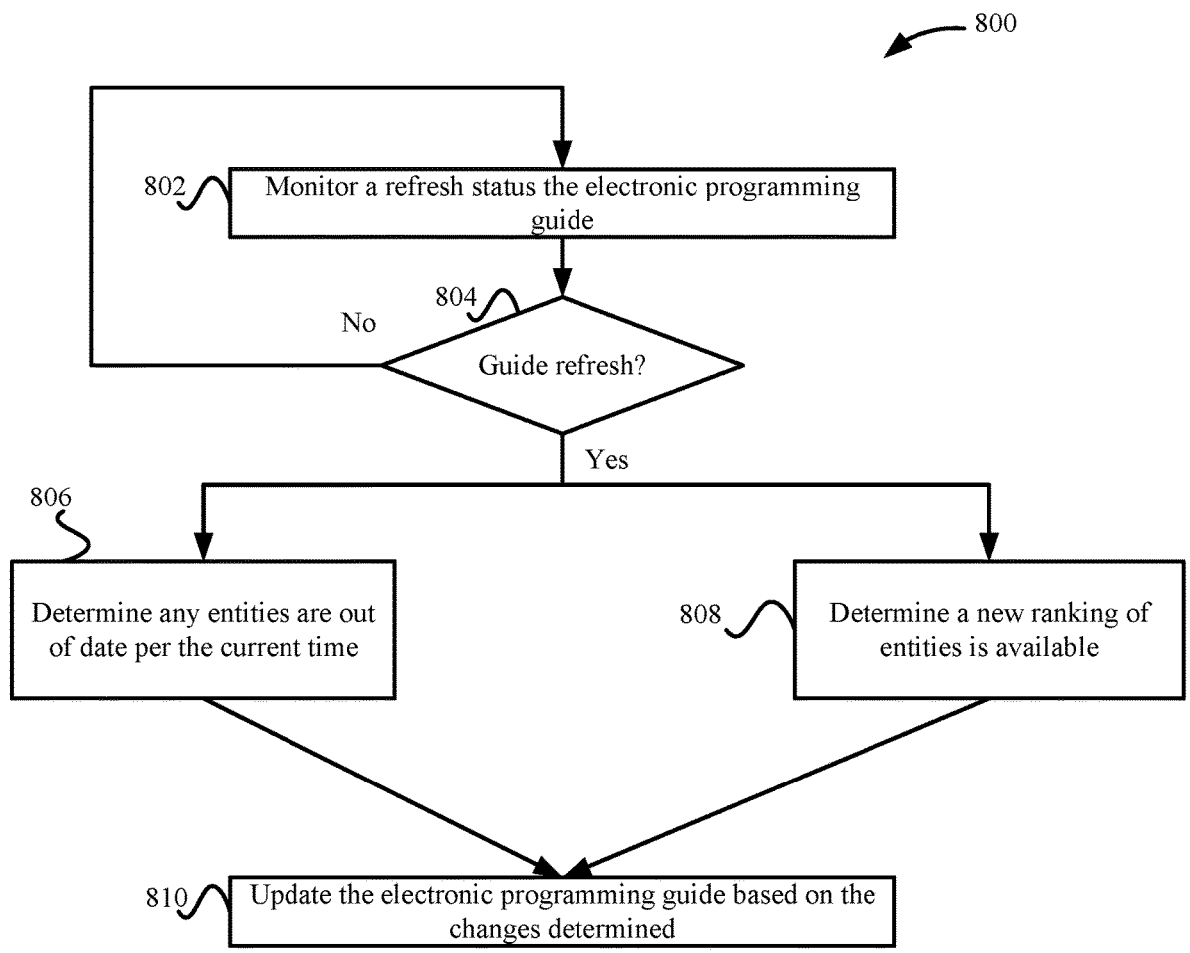
FIG. 8 depicts a simplified flowchart of a method for refreshing the electronic programming guide according to some embodiments.

Electronic programming guide 300 is refreshed at certain times. For example, electronic programming guide 300 may be refreshed at different set time intervals and/or when the ranking of the live-now collection on the home interface is refreshed. FIG. 8 depicts a simplified flowchart 800 of a method for refreshing electronic programming guide 300 according to some embodiments. At 802, guide generator 116 monitors a refresh status of electronic programming guide 300. For example, a refresh rate may cause electronic programming guide 300 to adjust at certain time intervals, such as every half hour. The refresh rate may be at certain time intervals to remove a time range that is no longer valid from electronic programming guide 300, such as if the current time is 9:45 AM, the time range of 9:00 AM to 9:30 AM is removed. In other examples, electronic programming guide 300 may be refreshed when a new ranking from ranker 118 is output. In some examples, guide generator 116 may minimize the refreshes to eliminate disruptive experiences for electronic programming guide 300. For example, electronic programming guide 300 may list the channels in rows and while a user is viewing the rows, switching the order of the rows dynamically may confuse the user. Accordingly, guide generator 116 may wait a certain amount of time from a last refresh to refresh electronic programming guide 300 again.

At 804, guide generator 116 determines if a refresh of the guide should be performed. If not, the process reiterates to 802 to continue monitoring the refresh status. If a guide refresh is determined, the refresh may be performed because entities are out of date for the current time or a new ranking of entities is available. Also, any marketing updates for a new campaign may become out of date, and those are also removed.

If a guide refresh should be performed, processes at 806 and 808 may be performed, if applicable. At 806, guide generator 116 determines if any entities are out of date for the current time. For example, some entities 202 (e.g., the programs) may have ended based on the current time. For example, if an entity ended at 9:30 AM, and the current time is 9:35 AM, then that entity 202 is out of date and guide generator 116 removes that entity 202 from the list of ranked entities. At 808, guide generator 116 determines if a new list of ranked entities is available. If a new list of ranked entities is available, guide generator 116 may use the new ranking to replace the old ranking.

At 810, guide generator 116 updates electronic programming guide 300 based on the changes determined. In some embodiments, guide generator 116 uses a smooth transition to update the guide. The transition may be performed with a visual effect that does not jar the visual display of electronic programming guide 300.

EXAMPLE

In some examples, at 6:30 PM, a program entitled "Program #1" is ranked with a priority #3 in the list of ranked entities for the live-now collection. Program #1 is found on a channel #1. In electronic programming guide 300, channel #1 is listed in the third priority row from the top of electronic programming guide 300.

At 7:00 PM, program #1 ends. Then, at 7:10 PM, the live-now collection is updated on the home interface. A new program entitled "Program #2" is located in the position with the third priority in the live-now collection and program #2 is found on a channel #2. Electronic programming guide 300 is then transitioned to re-position channel #2 in the third row of electronic programming guide 300.

CONCLUSION

Accordingly, electronic programming guide 300 may be prioritized based on a list of ranked entities for the live-now collection. When a user switches interfaces between the live-now collection and electronic programming guide 300, electronic programming guide 300 is configured based on list of ranked entities that is used to generate the live-now collection. This provides a smooth transition between the home interface and electronic programming guide 300. Also, because entities were ranked in order of relevance to the user account in the live-now collection, electronic programming guide 300 can be organized to display entities 202 that may be more relevant to a user in higher priority positions, such as at the top of electronic programming guide 300. This may increase the engagement of a user account with electronic programming guide 300 and allow a user to find entities 202 more easily that are more relevant to the user. Finding more relevant entities 202 may also increase the engagement of the user account by having the user account request more videos to play.

EXAMPLE EMBODIMENTS

In some embodiments, a method comprising: receiving, by a computing device, a list of ranked entities for video playback for a first interface in a first layout, the list of ranked entities being ranked based on personalized information for a user account; using, by the computing device, the list of ranked entities to determine an ordering of entities in slots of an electronic programming guide, wherein the slots of the electronic programming guide display the entities in a second layout based on a time dimension; and outputting, by the computing device, information to display at least a portion of the entities in the electronic programming guide based on the ordering of entities.

In some embodiments, the method further comprising: generating the list of ranked entities based on a prediction model that ranks entities based on the personalized information.

In some embodiments, generating the list of ranked entities comprises: determining entities that are live at a current time; and ranking the entities that are live in the list of ranked entities.

In some embodiments, the list of ranked entities are determined from a linear schedule of programming on live television.

In some embodiments, the first interface includes entities in the list of ranked entities that are live from a linear schedule of programming on live television, and the first interface include other entities that are available on demand.

In some embodiments, the first interface in the first layout is displayed, an input to display the electronic programming guide is received, and the list of ranked entities that is used to display entities in the first interface is used to determine the ordering of entities in the electronic program guide.

In some embodiments, using the list of ranked entities to determine the ordering of entities in the electronic programming guide comprises: determining a channel that is associated with an entity in the list of ranked entities; and moving the channel to a corresponding slot of priority in the electronic programming guide based on a priority of the entity in the list of ranked entities.

In some embodiments, using the list of ranked entities to determine the ordering of entities in the electronic programming guide comprises: determining additional entities for the channel that is associated with the entity in the list of ranked entities; and adding the additional entities to the corresponding slot of priority in the electronic programming guide.

In some embodiments, using the list of ranked entities to determine the ordering of entities in the electronic programming guide comprises: determining a channel that is associated with each entity in the list of ranked entities; and inserting each channel in a corresponding slot of priority in the electronic programming guide based on a priority of the entity in the list of ranked entities.

In some embodiments, using the list of ranked entities to determine the ordering of entities in the electronic programming guide comprises: inserting the at least a portion of the entities in slots in the electronic programming guide designated with a highest priority.

In some embodiments, using the list of ranked entities to determine the ordering of entities in the electronic programming guide comprises: inserting the at least a portion of the entities in a time range in the electronic programming guide that is designated for entities that are live at a current time.

In some embodiments, using the list of ranked entities to determine the ordering of entities in the electronic programming guide comprises: determining an additional entity for a channel in the at least a portion of the entities in a future time range, and inserting the additional entity in the electronic programming guide in the future time range.

In some embodiments, a non-transitory computer-readable storage medium containing instructions, that when executed, control a computer system to be operable for: receiving a list of ranked entities for video playback for a first interface in a first layout, the list of ranked entities being ranked based on personalized information for a user account; using the list of ranked entities to determine an ordering of entities in slots of an electronic programming guide, wherein the slots of the electronic programming guide display the entities in a second layout based on a time dimension; and outputting information to display at least a portion of the entities in the electronic programming guide based on the ordering of entities.

In some embodiments, a method comprising: displaying, by a computing device, a first interface in a first layout, wherein the first interface includes a list of ranked entities that are currently live at a current time and entities in the list of ranked entities are ordered according to a priority; receiving, by the computing device, an input to display an electronic programming guide, wherein the electronic programming guide displays entities in a second layout based on a time dimension; and displaying, by the computing device, at least a portion of the entities in the list of ranked entities in the electronic programming guide, wherein the at least the portion of the entities are ordered based on the priority of the list of ranked entities.

In some embodiments, displaying the at least a portion of the entities in the electronic programming guide comprises: moving a channel associated with an entity in the list of ranked entities to a corresponding slot of priority in the electronic programming guide based on a priority of the entity in the list of ranked entities.

In some embodiments, displaying the at least a portion of the entities in the electronic programming guide comprises: displaying additional entities for the channel that is associated with the entity in the list of ranked entities in the corresponding slot of priority in the electronic programming guide.

In some embodiments, displaying the at least a portion of the entities in the electronic programming guide comprises: displaying each channel associated with each entity in the list of ranked entities in a corresponding slot of priority in the electronic programming guide based on a priority of each respective entity in the list of ranked entities.

In some embodiments, displaying the at least a portion of the entities in the electronic programming guide comprises: displaying the at least a portion of the entities in slots in the electronic programming guide designated with a highest priority.

In some embodiments, displaying the at least a portion of the entities in the electronic programming guide comprises: displaying the at least a portion of the entities in a time range in the electronic programming guide designated for entities that are live at a current time.

In some embodiments, displaying the at least a portion of the entities in the electronic programming guide comprises: displaying an additional entity for a channel in the at least a portion of the entities in a future time range in the electronic programming guide.

System

Figure 9:
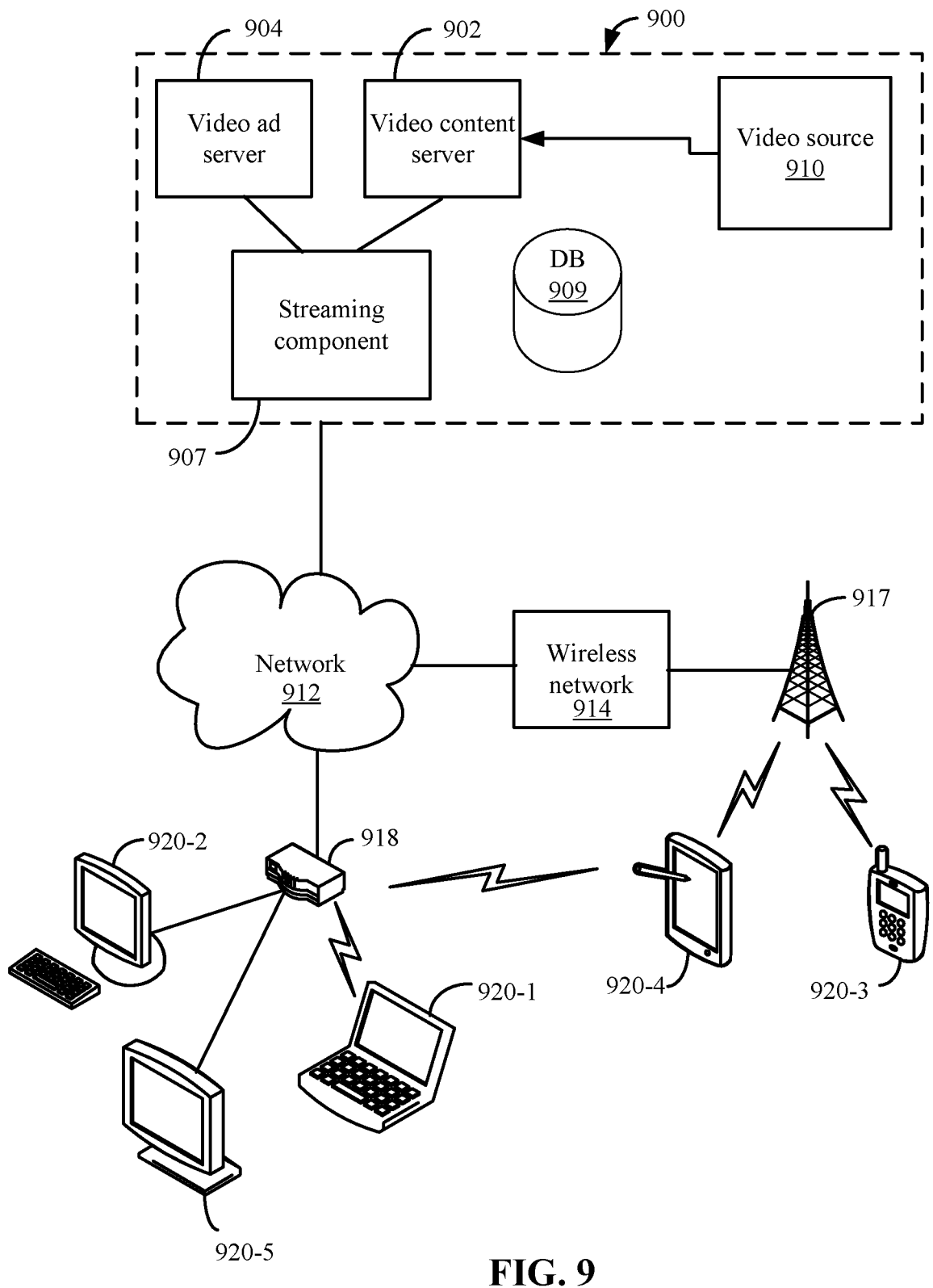
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and/or 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown).

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless cellular telecommunications network (WCS) 914, or some combination of these or similar networks.

One or more client devices 920 may be in communication with the video streaming system 900, via the data communication network 912, wireless cellular telecommunications network 914, and/or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for a wireless cellular telecommunications network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HTTP and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
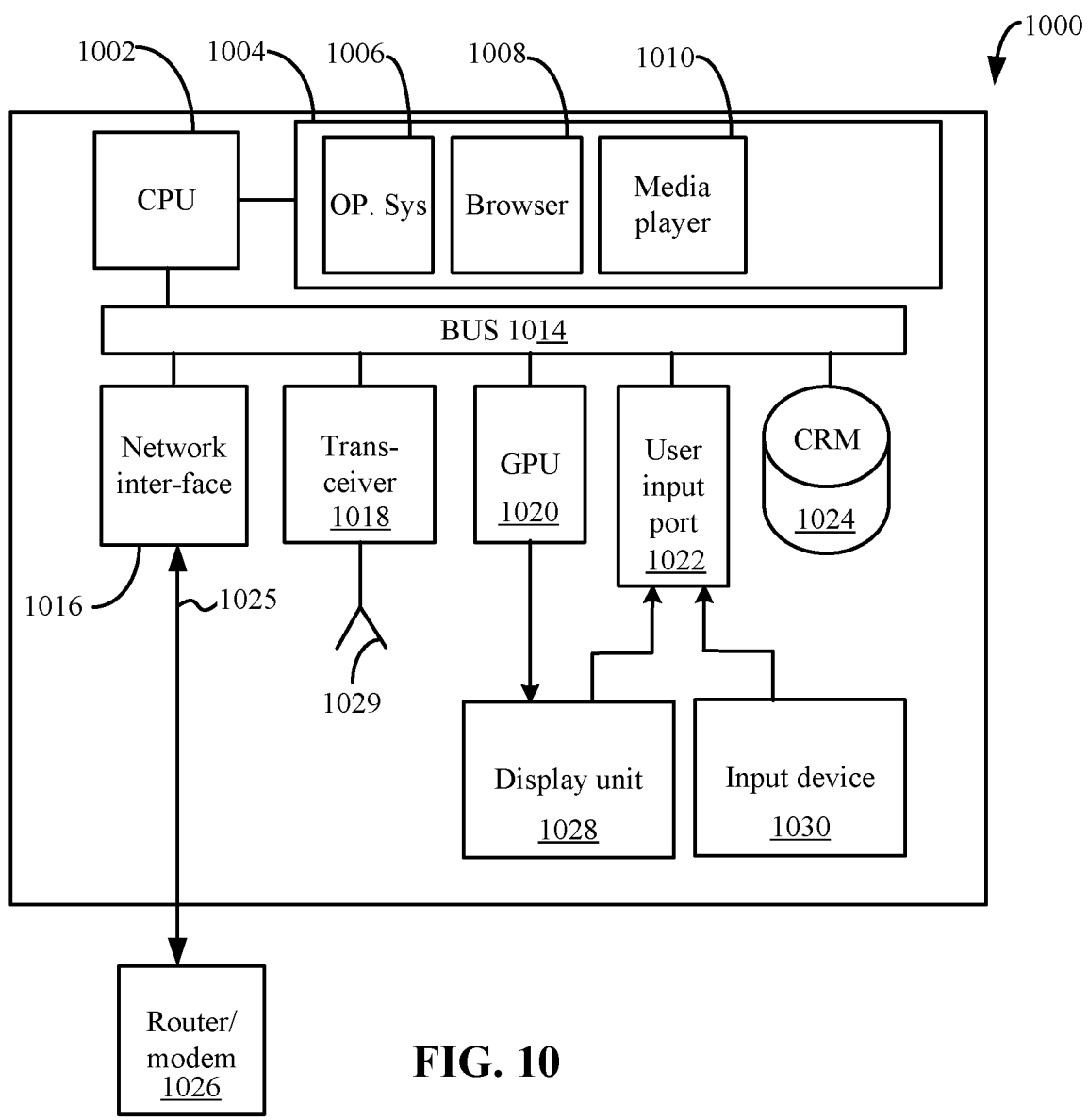
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured or operable to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules 1006, 1008, 1010 and 1012 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured or operable to perform one or more operations of a method as described herein.

A communication interface 1016 may also be connected to the bus 1014. The communication interface 1016 may provide or support two-way data communication between the apparatus 1000 and one or more external devices, e.g., the streaming system 900, optionally via a router/modem 1026 and a wired or wireless connection. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera, or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a list of ranked entities for video playback for a first interface in a first layout, the list of ranked entities being ranked in a first order based on personalized information for a user account;
   using, by the computing device, at least a portion of the list of ranked entities to determine corresponding channels that are playing the at least the portion of the list of ranked entities;
   rearranging, by the computing device, the channels in a second order in slots of an electronic programming guide based on corresponding rankings in the first order for the at least the portion of the list of ranked entities, wherein the slots of the electronic programming guide display channels in a second layout based on a time dimension; and
   switching, by the computing device, from a display of the first interface to a display of a second interface for the electronic programming guide, wherein the second interface includes the channels in the electronic programming guide based on the second order.

2. The method of claim 1, further comprising:
   generating the list of ranked entities based on a prediction model that ranks entities based on the personalized information.

3. The method of claim 1, wherein the list of ranked entities is generated by:
   determining entities that are live at a current time; and
   ranking the entities that are live in the list of ranked entities.

4. The method of claim 1, wherein the list of ranked entities is determined from a linear schedule of programming on live television.

5. The method of claim 1, wherein:
   the first interface includes entities in the list of ranked entities that are live from a linear schedule of programming on live television, and
   the first interface includes other entities that are available on demand.

6. The method of claim 1, wherein:
   the first interface in the first layout is displayed using the list of ranked entities,
   an input to display the electronic programming guide is received, and
   the list of ranked entities is used to determine corresponding channels that are playing the at least the portion of the list of ranked entities.

7. The method of claim 1, wherein using the at least the portion of the list of ranked entities to determine corresponding channels and rearranging the channels comprises:
   determining a channel that is associated with an entity in the list of ranked entities; and
   moving the channel to a corresponding slot of priority in the electronic programming guide based on a priority of the entity in the list of ranked entities.

8. The method of claim 7, wherein using the at least the portion of the list of ranked entities to determine corresponding channels and rearranging the channels comprises:
   determining additional entities for the channel that is associated with the entity in the list of ranked entities; and
   adding the additional entities to the corresponding slot of priority in the electronic programming guide.

9. The method of claim 1, wherein using the at least the portion of the list of ranked entities to determine corresponding channels and rearranging the channels comprises:
   determining a channel that is associated with each entity in the at least the portion of the list of ranked entities; and
   inserting each channel in a corresponding slot of priority in the electronic programming guide based on a priority of the entity in the first order of the list of ranked entities.

10. The method of claim 1, wherein rearranging the channels comprises:
   inserting respective channels for the at least the portion of the list of ranked entities in slots in the electronic programming guide designated with a highest priority.

11. The method of claim 1, wherein rearranging the channels comprises:
   inserting respective channels for the at least the portion of the list of ranked entities in a time range in the electronic programming guide that is designated for entities that are live at a current time.

12. The method of claim 11, wherein using the at least the portion of the list of ranked entities to determine corresponding channels and rearranging the channels comprises:
   determining an additional entity for a channel in the at least the portion of the list of ranked entities in a future time range, and
   inserting the additional entity for the channel in the electronic programming guide in the future time range.

13. The method of claim 1, wherein the first order and the second order are the same.

14. The method of claim 1, further comprising:
   removing an entity from the list of entities to generate the at least the portion of the list of ranked entities.

15. A non-transitory computer-readable storage medium containing instructions, that when executed, control a computer system to be operable for:
   receiving a list of ranked entities for video playback for a first interface in a first layout, the list of ranked entities being ranked in a first order based on personalized information for a user account;
   using at least a portion of the list of ranked entities to determine corresponding channels that are playing the at least the portion of the list of ranked entities;
   rearranging the channels in a second order in slots of an electronic programming guide based on corresponding rankings in the first order for the at least the portion of the list of ranked entities, wherein the slots of the electronic programming guide display channels in a second layout based on a time dimension; and
   switching from a display of the first interface to a display of a second interface for the electronic programming guide, wherein the second interface includes the channels in the electronic programming guide based on the second order.

16. A method comprising:
   displaying, by a computing device, a first interface in a first layout, wherein the first interface includes a list of ranked entities that are currently live at a current time and entities in the list of ranked entities are ordered in a first order according to a priority;
   receiving, by the computing device, an input to display an electronic programming guide, wherein the electronic programming guide displays entities in a second layout based on a time dimension;
   determining, by the computing device, corresponding channels that are playing at least the portion of the list of ranked entities;
   rearranging, by the computing device, the channels in a second order in slots of the electronic programming guide based on corresponding rankings in the first order for the at least the portion of the list of ranked entities; and
   displaying, by the computing device, the channels based on the second order in the electronic programming guide.

17. The method of claim 16, wherein rearranging the channels comprises:
   moving a channel associated with an entity in the at least the portion of the list of ranked entities to a corresponding slot of priority in the electronic programming guide based on a priority of the entity in the at least the portion of the list of ranked entities.

18. The method of claim 17, wherein displaying the channels comprises:
   displaying additional entities for the channel that is associated with the entity in the at least the portion of the list of ranked entities in the corresponding slot of priority in the electronic programming guide.

19. The method of claim 16, wherein displaying the channels comprises:
   displaying each channel associated with each entity in the at least the portion of the list of ranked entities in a corresponding slot of priority in the electronic programming guide based on a priority of each respective entity in the first order.

20. The method of claim 16, wherein displaying the channels comprises:
   displaying the channels in slots in the electronic programming guide designated with a highest priority.

21. The method of claim 16, wherein displaying the channels comprises:
   displaying the channels in a time range in the electronic programming guide designated for entities that are live at a current time.

22. The method of claim 21, wherein displaying the channels comprises:
   displaying an additional entity for a channel in the at least the portion of the list of ranked entities in a future time range in the electronic programming guide.

* * * * *